United States Patent [19]
Itoh

[11] Patent Number: 6,105,351
[45] Date of Patent: Aug. 22, 2000

[54] MOWING MACHINE HAVING DISK BLADE CUTTERS

[75] Inventor: Kazuo Itoh, Kasai, Japan

[73] Assignee: Itoh Electric Co., Ltd., Hyogo, Japan

[21] Appl. No.: 09/111,600

[22] Filed: Jul. 7, 1998

[51] Int. Cl.[7] .......................... A01D 34/52; A01D 34/73; A01G 3/04; B26B 13/00; B26B 7/00
[52] U.S. Cl. .......................... 56/235; 56/233; 56/234; 56/255; 56/DIG. 12; 56/DIG. 17; 30/173; 30/265; 30/276
[58] Field of Search .............................. 56/233, 234, 235, 56/255, 295, DIG. 6, DIG. 12, DIG. 17, DIG. 20; 30/173, 264, 265, 275.4, 276

[56] References Cited

U.S. PATENT DOCUMENTS

| | | | |
|---|---|---|---|
| 625,584 | 5/1899 | Miller | 56/255 |
| 1,130,283 | 3/1915 | Hewett et al. | 56/255 |
| 1,414,239 | 4/1922 | Warren | 30/264 |
| 2,532,982 | 12/1950 | De Young | 30/264 |
| 2,598,091 | 5/1952 | Ahlgrim | 56/295 |
| 4,881,363 | 11/1989 | Terai et al. | 56/255 |
| 4,987,732 | 1/1991 | Terai et al. | 56/255 |
| 4,998,401 | 3/1991 | Terai et al. | 56/255 |
| 5,012,633 | 5/1991 | Ito et al. | 56/12.9 |
| 5,044,146 | 9/1991 | Nakamura | 56/11.3 |
| 5,054,276 | 10/1991 | Terai et al. | 56/242 |
| 5,174,099 | 12/1992 | Matsuura | 56/12.1 |
| 5,402,576 | 4/1995 | Kiyooka et al. | 30/216 |

FOREIGN PATENT DOCUMENTS

H7-28818 U  7/1995  Japan .

*Primary Examiner*—Eileen Dunn Lillis
*Assistant Examiner*—Gary S. Hartman
*Attorney, Agent, or Firm*—Koda & Androlia

[57] ABSTRACT

A mowing machine for cutting plants with radially protruding blades of upper and lower blade disks which are coaxially disposed and rotated under the hood that is disposed at the end of a handle. The upper blade disk has a ring gear, the lower blade disk has a sun gear, and a transmission gear is provided between the ring gear and the sun gear and meshes these gears so as to rotate the ring and sun gears in the opposite directions, thus rotating the upper and lower blade disks in the opposite directions for producing a shearing force that cuts the plants.

7 Claims, 5 Drawing Sheets

FIG. 8 and

MOWING MACHINE HAVING DISK BLADE CUTTERS

BACKGROUND OF THE INVENTION

1. Field of the Invention

The present invention relates to a mowing machine of the type that uses a highrevving engine or motor as its power source, whose revolution is reduced at a large reduction ratio to drive an upper blade disk and a lower blade disk in opposite directions so that blades protruding from the edges of the two blade disks cut plants in such a way that scissors cut materials.

2. Prior Art

As a rotary drive mechanism of a mowing machine for rotatably driving an upper blade disk and a lower blade disk in opposite directions, a planetary gear reduction mechanism comprising a sun gear, a ring gear and planet gears is disclosed in Japanese Utility Model Application Publication No. H 7-28818. In this mechanism, the engine revolution is reduced first by a worm and a worm wheel and then by the planetary gear reduction mechanism to obtain a target revolution.

The problem with the reduction mechanism according to the prior art is that it employs many gears, resulting in a heavy mowing machine, which is inconvenient for a worker to handle when using it.

SUMMARY OF THE INVENTION

The object of the present invention, therefore, is to conceive a light and easy-to-operate mowing machine having a simple reduction mechanism that is capable of obtaining a desired revolution using a simple reduction mechanism.

The object of the present invention is accomplished by a unique structure for a mowing machine for cutting plants by way of the use of a plurality of blades protruding from the edges of upper and lower blade disks which are coaxially disposed and rotated in opposite directions, wherein a sun gear equipped with a lower blade disk and a ring gear equipped with an upper blade disk are installed below a plate-shaped main unit case in which a plurality of vertical supporting bars are circularly disposed with a specific distance from the center of the main unit case, and rotary members that circumscribe the sun gear and inscribe the ring gear are rotatably mounted on some of the supporting bars, and wherein at least one of the rotary members is a transmission gear that meshes both the sun gear and the ring gear, and at least one transmission gear is a driving gear driven by a power source; and in addition, a holding means is provided on each of the supporting bars so as to prevent radial movements of the transmission, sun and ring gears.

DETAILED DESCRIPTION OF THE PREFERRED EMBODIMENTS

In the present invention, a plate-shaped main unit case 5 is employed, and gears, which constitute the power transmission mechanism, are installed so as to be hung from the plate-shaped main unit case 5.

The main unit case 5 is provided with vertical supporting bars 6 arranged in a plurality of positions on a circle made by connecting all the points having a specific distance from the center of the main unit case, and below the main unit case 5, a sun gear 7 equipped with a lower blade disk 4 and a ring gear 8 equipped with an upper blade disk 3 are disposed coaxially with the circle.

At least some of the plurality of supporting bars 6 standing vertically on the main unit case 5 axially support rotary elements, specifically rollers or transmission gears 9, that circumscribe the sun gear 7 and inscribe the ring gear 8. All of these rotary elements can be transmission gears, but at least one of them should be the transmission gear 9 that meshes with both the sun gear 7 and the ring gear 8, and each supporting bar 6 should be provided with a holding means that prevent radial, i.e., axial play of the transmission gear 9, sun gear 7 and ring gear 8. This allows the sun gear 7 and the ring gear 8 to rotate in opposite directions via the transmission gear 9. Therefore by rotatably driving at least one of the transmission gears by the power source such as an engine or a motor, the high speed revolution of the transmission gear 9 is reduced at a large reduction ratio determined by the gear ratios of the sun gear 7 to the transmission gear 9 and of the ring gear 8 to the transmission gear 9, enabling the upper blade disk 3 and the lower blade disk 4 to be rotatably driven in opposite directions at the large reduction ratio.

The main unit case 5 can be of a plate or disk shape, but in the interests of a lighter weight, it should be annular with a through hole 5a provided in its center portion and the sun gear 7 should also be provided with a center hole to make it an annular gear with external teeth. The transmission gear 9, the sun gear 7, and the ring gear 8 are configured so that their radial play is inhibited. Specifically, the supporting bars 6 fasten an annular upper supporting plate 14 and an annular lower supporting plate 15 to the main unit case via spacers 16 in such a way that the supporting plates face each other at a certain distance. Moreover, between the upper supporting plate 14 and the upper surface of the transmission gear 9 an upper roller 18 is provided, and between the lower supporting plate 15 and the lower surface of the transmission gear 9 a lower roller 19 is provided so as to inhibit the vertical movement of the transmission gear. Furthermore, guide plates of a diameter larger than that of the transmission gear are fastened on the upper and lower surfaces of the transmission gear 9 so that the transmission gear and the sun gear are not disengaged from each other.

A more detailed description of the present invention will be described below with reference to the embodiments thereof.

Figure 4:
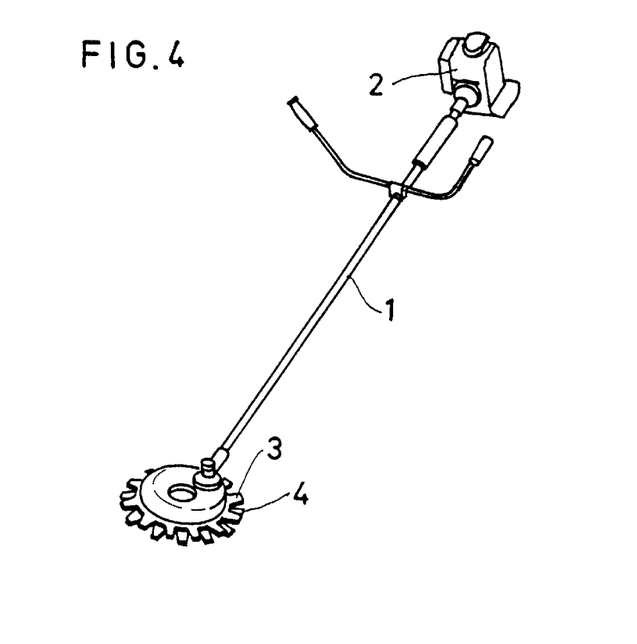
FIG. 4 is a perspective view of the entire mowing machine according to the embodiment shown in FIG. 1.

As shown in FIG. 4, in the mowing machine of the present invention, the revolution of the power source, e.g., an engine 2, mounted at the base portion of handle 1 is reduced and transmitted to an upper blade disk 3 and a lower blade disk 4. At this time upper blade disk 3 and lower blade disk 4 rotate in opposite directions. The operator holds handle 1 when mowing. Blades 3a established on the upper blade disk 3 and blades 4a established on the lower blade disk 4 cut plants in such a way that scissors cut materials.

Figure 1:
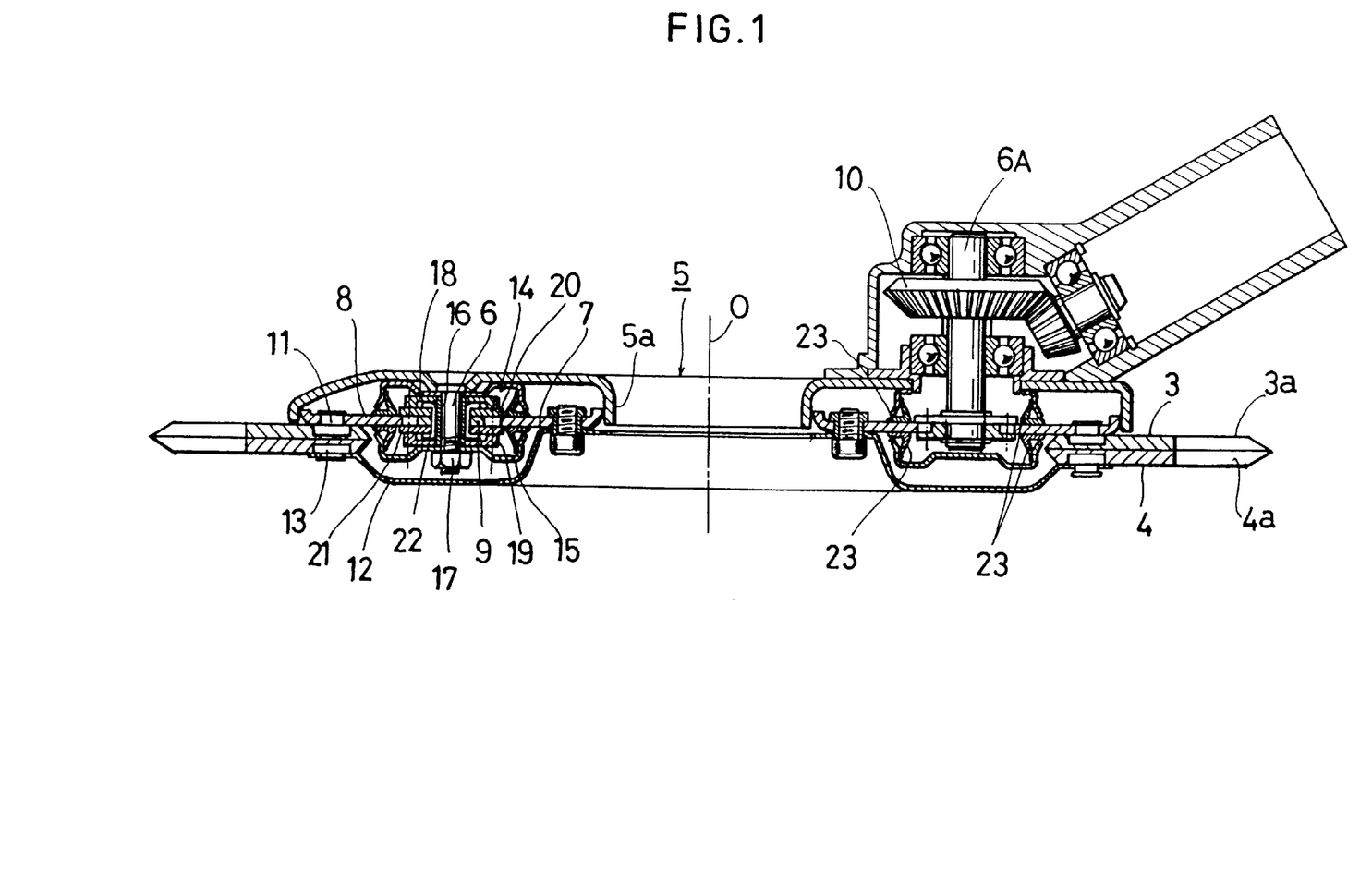
FIG. 1 is a longitudinal sectional view of the main unit portion of the mowing machine according to one embodiment of the present invention.

FIG. 1 is a longitudinal sectional view showing only the main unit, which is mounted at the tip of the handle 1, of the mowing machine. The handle is attached to the main unit obliquely from above.

On main unit case 5, which is provided with a through hole 5a in its center portion to make it annular, vertical supporting bars 6 are established in a plurality of positions (twelve equally spaced out positions in the illustrated examples) on a circle made by connecting all the points having a specific distance from center O. Below main unit case 5, a sun gear 7 (an annular gear with external teeth) having an external diameter smaller than that of the circle and a ring gear 8 (an annular gear with internal teeth) having an internal diameter larger than that of the circle are disposed. At least two or more supporting bars 6 axially support rotary elements, e.g., rollers or transmission gears 9, that circumscribe the sun gear and inscribe the ring gear, so that the sun gear 7 and the ring gear 8 smoothly rotate in opposite directions around center O, with no horizontal play.

Both main unit case 5 and sun gear 7 may be solid-disk-shaped, but by making them annular, a through hole that runs through the center portion of the unit can be formed.

This through hole not only makes the whole unit lighter, but provides a further advantage that chips generated during the mowing operation can be removed through it.

Figure 3:
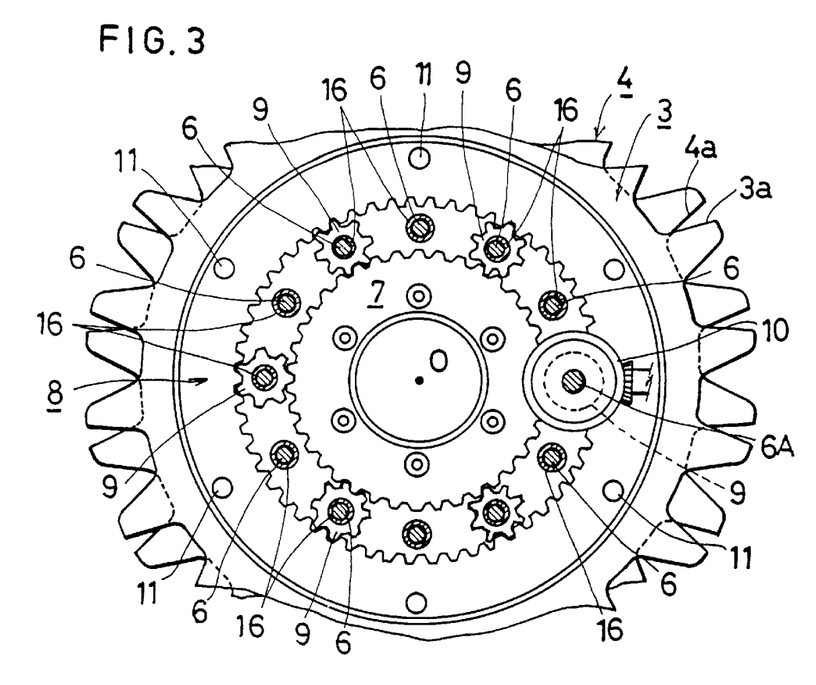
FIG. 3 is a plan view of the power transmission mechanism of the main unit of the same mowing machine according to the embodiment shown in FIG. 1.

FIG. 3 is a plan view showing a gear mechanism. On a circle made by connecting all the points having a specific distance from center O, supporting bars 6 are disposed in twelve equally spaced out positions, with every other supporting bar 6 provided with a transmission gear 9, 9, and one of such transmission gears (i.e., the gear at the extreme right in this drawing) is used as the driving gear. It is also possible to employ multiple transmission gears as driving gears. Transmission gears other than the driving gear are idle gears, which contribute to the smooth rotation of the sun gear 7 and the ring gear 8. For smooth driving of the gears, a plurality, preferably three or more, of transmission gears 9, 9, including the idle gears, may be employed.

In FIG. 3, 6A indicates the center shaft of the transmission gear functioning as the driving gear. Center shaft 6A is extended upward, where a bevel gear 10 is mounted. The revolution of the engine is transmitted to the bevel gear 10 via a power-transmission means (shaft, flexible shaft, etc.) attached to the handle 1 of the mowing machine. In the illustrated example, a small bevel gear driven at a high speed by the engine meshes with the bevel gear 10, which is larger, mounted on the center shaft 6A to effect a first-stage reduction at the input stage.

When the driving gear is rotatably driven, sun gear 7, to which lower blade disk 4 is united, and ring gear 8, to which upper blade disk 3 is united, rotate in opposite directions, performing a mowing operation with blades 3a of upper blade disk 3 and blades 4a of lower blade disk 4. Upper blade disk 3 is united to ring gear 8 via pins 11, etc., in a detachable manner on the outer edge of ring gear 8. On the other hand, in order to unite lower blade disk 4 to sun gear 7, a coupling plate 12 that extend outward beneath transmission gears 6 is fastened to the lower surface of sun gear 7 using bolts, etc., then the sun gear 7 is united in a detachable manner to the edge of the coupling plate 12 using attaching pins 13, etc.

Figure 2:
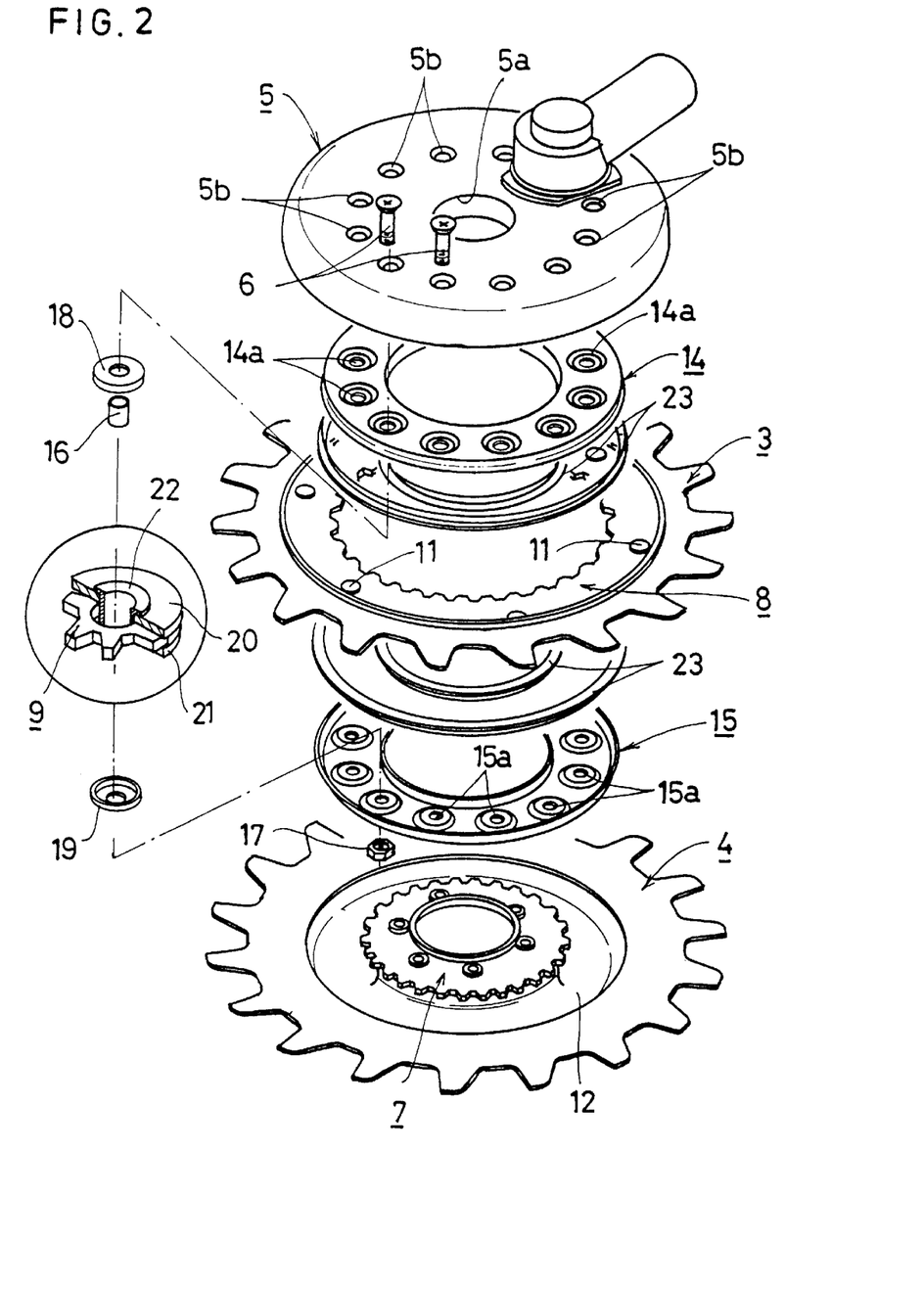
FIG. 2 is an exploded perspective view of the main unit portion of the same mowing machine according to the embodiment shown in FIG. 1.

In the illustrated examples, bolts are used as supporting bars 6. A specific example using such supporting bars 6 to vertically support the entire mechanism will now be described. Beneath the main unit case 5, an annular upper supporting plate 14 with edges protruding downward and an annular lower supporting plate 15 with edges protruding upward are disposed. Main unit case 15, upper supporting plate 14 and lower supporting plate 15 are respectively provided with bolt holes, 5b, 14a, 15a, through which supporting bars 6 (bolts) are inserted from above the main unit case 5. These supporting bars 6 (bolts) are screwed into nuts 17 with spacers 16 inserted between the upper supporting plate 14 and the lower supporting plate 15. Upper supporting plate 14 and lower supporting plate 15 are thus fastened with a certain space between them to the supporting bars 6 vertically established on the main unit case. These supporting bars are disposed in twelve equally spaced out positions, but because the driving gear is disposed in one of these positions, there are actually eleven supporting bars.

Transmission gears 9 that function as idle gears are axially supported by every other supporting bar 6 (altogether five supporting bars according to this drawing), which respectively maintains a certain space between the upper supporting plate 14 and the lower supporting plate 15 using a spacer 16. The supporting bars that do not axially support transmission gears 9 function as structural members that add sturdiness to the maintenance of the space between the upper supporting plate 14 and the lower supporting plate 15.

An upper roller 18 is disposed between the upper supporting plate 14 and the upper surface of each transmission gear 9 mounted on each supporting bar 6, and a lower roller 19 is disposed between the lower supporting plate 15 and each transmission gear 9, so that there is no gap above or below the transmission gears 9 and that the transmission gears 9 do not play in the radial direction.

As shown in an enlarged view in FIG. 2, the upper surface of transmission gear 9 comes into contact with a disk-shaped upper guide plate 20, which has a diameter larger than that of transmission gear 9, whereas the bottom surface comes into contact with a lower guide plate 21, and these guide plates are joined by a metal shaft 22. Accordingly, sun gear 7 and ring gear 8 meshing with transmission gears 9 are respectively held on the same flat planes by the upper guide plate 20 and lower guide plate 21 so that their engagement with transmission gears 9 is maintained. Corresponding to this configuration of the transmission gears, the upper roller 18 that prevents play of the transmission gears is shaped like a downward facing cup, whereas the lower roller 19 is shaped like an upward facing cup. These rollers respectively contact the upper guide plate 20 and lower guide plate 21 that are united with the transmission gears, thereby preventing the transmission gears, sun gear and ring gear from playing vertically.

The edges of the upper supporting plate 14, which protrude downward, and those of the lower supporting plate 15, which protrude upward, are provided with annular gaskets 23. The inner gaskets contact the upper and lower surfaces of the sun gear 7, whereas the outer gaskets contact the upper and lower surfaces of the ring gear, thereby forming a sealed meshing space for the transmission gears 9, sun gear 7 and ring gear 8. For smooth driving of the gears, this meshing space may be filled with lubricant such as grease.

In the illustrated embodiment, the upper supporting plate 14 and the lower supporting plate 15 have protruding edges, but the edges may also be flat. In this case, a downward protruding tubular gasket is used for the upper supporting plate, and an upward protruding tubular gasket is used for the lower supporting plate.

The upper supporting plate 14 and the lower supporting plate 15 not only form the sealed meshing space, but hold the sun gear 7 and the ring gear 8 firmly so that they securely mesh with the transmission gears in cooperation with the upper and lower guide plates of the transmission gears.

As a holding means for inhibiting axial play of the transmission gears, sun gear and ring gear, a wide supporting plate may be established at the ends of the supporting bars so as to support the assembly of the transmission gears, sun gear and ring-gear.

Figure 5:
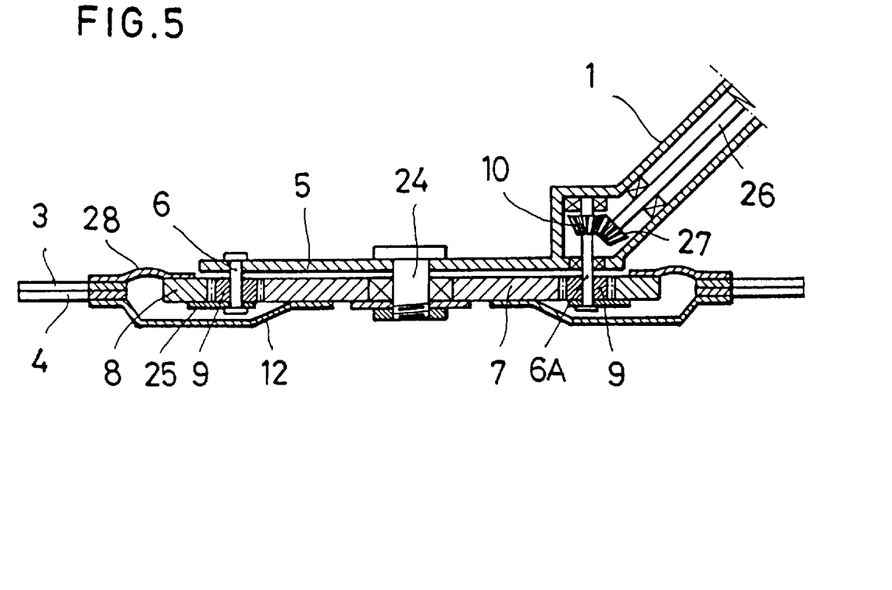
FIG. 5 is a longitudinal sectional view of the main unit portion of a mowing machine according to another embodiment of the present invention.
Figure 6:
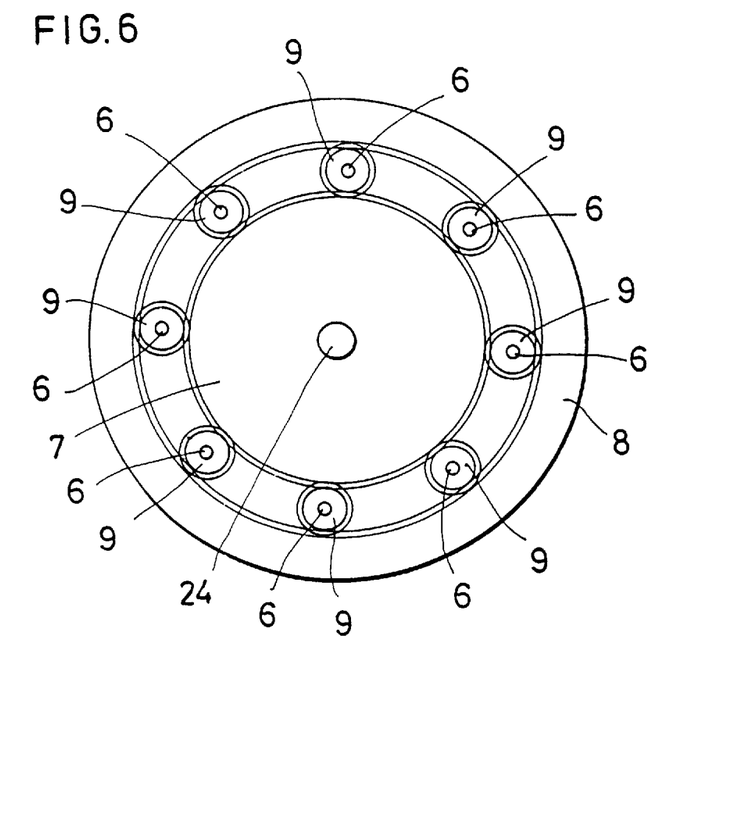
FIG. 6 is a schematic plan view showing a gear configuration in the reduction mechanism of the embodiment shown in FIG. 5.

FIGS. 5 and 6 show simplified embodiments of the present invention. FIG. 5 is a longitudinal sectional view, and FIG. 6 is a plan view showing only the reduction mechanism. As shown in FIG. 6, the reduction mechanism comprises sun gear 7, ring gear 8, which surrounds the sun gear 7, and a plurality of transmission gears 9 disposed between the sun gear 7 and the ring gear 8 so as to mesh with them. In this embodiment, the sun gear 7 is axially supported by a center shaft 24 established in the center portion of the disk-shaped main unit case 5. On the periphery of the sun gear 7, supporting bars 6 are established vertically with respect to the main unit case 5, and transmission gears 9 are mounted on them while meshing with the sun gear 7 and ring gear 8. Below the ring gear 8, auxiliary rings 25 are disposed, supporting part of the ring gear 8 from below. These auxiliary rings 25 are mounted on the lower surfaces of the transmission gears 9 via supporting bars 6, thereby preventing ring gear 8 and sun gear 7 from playing axially (i.e., radially).

One of these transmission gears is the driving gear. In the illustrated example, the bevel gear 10 mounted on the center shaft 6A of the driving transmission gear 9 is meshed with a bevel gear 27 mounted on the tip of a drive shaft 26 running through handle 1. In other words, the revolution of an engine or a motor is transmitted to the transmission gear 9, which rotates sun gear 7 and ring gear 8 in opposite directions. A lower-blade-disk coupling plate 12, which is fastened to the lower surface of the sun gear 7, has an outer edge that projects outward of the ring gear 8, and lower blade disk 4 is fastened to its upper surface. On the upper surface of the ring gear 8, an upper-blade-disk coupling plate 28 is fastened, and the upper blade disk 3 is fastened to the lower surface of its periphery. As such, the upper blade disk 3 and the lower blade disk 4 rotate in opposite directions to perform mowing in such a way that scissors cut materials. The upper blade disk 3 and the lower blade disk 4 can be of any shape or combination of shapes.

Figure 7:
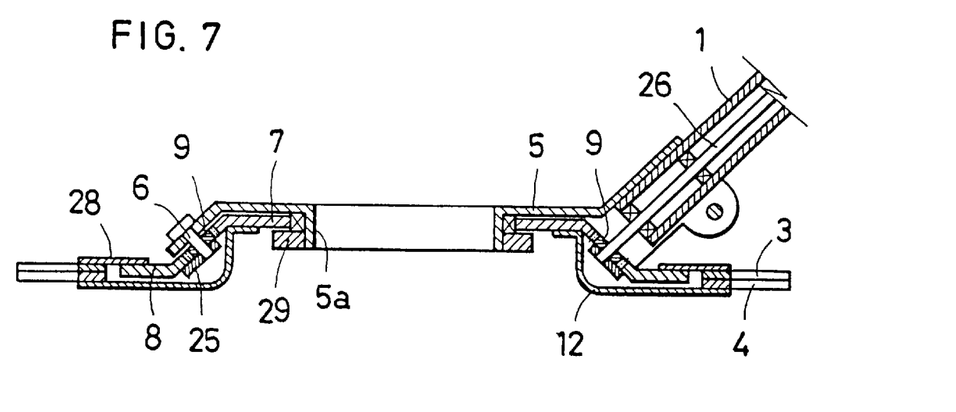
FIG. 7 is a longitudinal sectional view of the main unit portion of a mowing machine according to still another embodiment of the present invention.

FIG. 7 is a longitudinal sectional view of another embodiment. This embodiment is characterized in that transmission gears 9 are mounted at an oblique angle, and that an annular, or cylindrical, sun gear 7 is utilized. A through hole 5a, which also functions as a supporting barrel, is established vertically in the center portion of the main unit case 5, and the cylindrical sun gear 7 is fitted in the supporting barrel in a rotatable manner, while a lock-nut-like fastening member 29 is screwed onto the lower end of the supporting barrel to prevent sun gear 7 from falling off.

Figure 8:
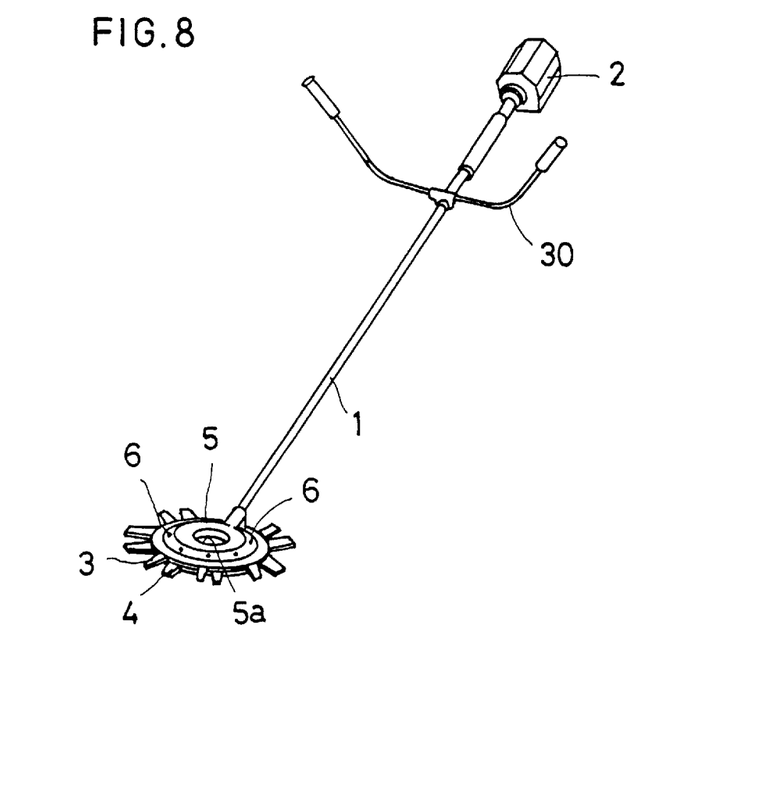
FIG. 8 is a perspective view of the entire mowing machine shown in FIG. 7.

The external edge of the sun gear 7 is inclined downward while the internal edge of the ring gear 8 is inclined upward so as to match the inclination of the external edge of the sun gear, and the transmission gears 9 are disposed between these edges. The external edge of the main unit case 5, which supports the transmission gears 9, is also inclined downward, and the transmission gears 9 are supported by supporting bars 6 on the inclined surface. According to this embodiment, the transmission gear that functions as the driving gear is fastened to the tip of a drive shaft 26 that runs through a handle 1 established at an angle of 90i with respect to the inclined surface of the main unit case 5 as shown in FIGS. 7, 8, and the drive shaft 26 is rotated by an engine 2 mounted at the base of handle 1. In this embodiment, the drive shaft 26, which is disposed obliquely with respect to the rotation axis of the upper and lower blade disks, can directly drive the driving transmission gear 9, eliminating the need for an input-axis-changing mechanism, such as a bevel gear, flexible shaft, etc.

FIG. 8 is a perspective view of the entire mowing machine according to the embodiment shown in FIG. 7. In this mowing machine, handle 1 protrudes obliquely from the donut-shaped main unit, which has a through hole in its center portion, i.e., the center of the mowing blades comprising the upper blade disk 3 and the lower blade disk 4. The worker holds the handle 1 when mowing. At the base of handle 1, a power source such as the engine 2 or a motor is mounted, and at the middle portion of the handle 1, an operation handle 30 is provided.

According to the mowing machine of the present invention described in claim 1, a large reduction ratio can be obtained with a simple configuration having a small number of gears for a power transmission mechanism of a mowing machine that mows plants with a plurality of blades protruding from the edges of the upper and lower blade disks by rotating the upper and lower blade disks at a low speed. The reduction mechanism is supported by supporting bars established vertically on the plate-shaped main unit case, achieving a light and easy-to-operate mowing machine.

According to the invention described in claim 2, the mowing machine described in claim 1 is made of a simple and easy-to-manufacture configuration comprising a sun gear and transmission gears, which are ordinary spur gears, and a ring gear, which is an annular internal gear.

According to the invention described in claim 3, the entire mowing machine can be made lighter by making the main unit case and sun gear light; moreover the through hole formed in the center portion of the machine effectively removes the chips that are generated and accumulated on the surface of the machine during the mowing operation. Furthermore, the conventional high-speed mowing machines often caused the trouble of mown grass twining round the center shaft of the rotary blades. The invention described in claim 3, on the other hand, uses no center shaft, so there will be much fewer troubles relating to twined grass.

In addition to the effects of the invention described in claim 3, according to the invention described in claim 4, the sun gear can be mounted in a more stable manner.

According to the invention described in claim 5, the meshing condition of the transmission gears, sun gear and ring gear, which constitute the power transmission mechanism, can be reliably maintained with a simple configuration, contributing to the maintenance of a stable driving condition.

According to the invention described in claim 6, a sealed space filled with lubricant is formed using the configuration described in claim 5, so it is possible to realize a smoother running condition. The rotary driving mechanism can also be made fully water proof, so it is possible to perform underwater mowing, which was impossible with the conventional high-speed rotary mowing machine.

According to the invention described in claim 7, the driving transmission gear is mounted obliquely, and it is possible to match the inclination of its rotation axis with the inclination of the handle of the mowing machine. This makes the power transmission mechanism simpler by allowing the driving transmission gear to be mounted at the tip of the drive shaft, which is directly connected to the power source, e.g., an engine.

What is claimed is:

1. A mowing machine for cutting plants using a plurality of blades protruding from edges of an upper blade disk and a lower blade disk, which are coaxially disposed and rotate in opposite directions, characterized in that the mowing machine comprises:

a plate-shaped main unit case provided with vertical supporting bars disposed along a circle having a specific radial distance from a center of the main unit case;

a sun gear equipped with a lower blade disk and a ring gear equipped with an upper blade disk, said sun gear and ring gears being provided below the main unit case and coaxial with said circle;

rotary elements that are provided between and circumscribe the sun gear and inscribe the ring gear and are rotatably mounted on at least a plurality of the vertical supporting bars, at least one of said rotary elements being a transmission gear meshing with both the sun gear and the ring gear, and said at least one transmission gear being a driving gear driven by a power source; and a holding means provided on each of said supporting bars for preventing radial play of the transmission, sun and ring gears.

2. A mowing machine according to claim 1, in which a center shaft is provided in a center portion of the main unit case, and the sun gear is axially mounted on said center shaft.

3. A mowing machine according to claim 1, in which the main unit case is an annular case having a through hole in a center portion thereof, and the sun gear is an annular external gear having a through hole in a center portion thereof, thereby a vertically running through hole is provided in a center portion of the mowing machine.

4. A mowing machine according to claim 3, in which a tubular center shaft is provided in a through hole formed in the main unit case, and the sun gear is axially mounted on said center shaft.

5. A mowing machine according to any one of claims 1 to 4, in which an annular upper supporting plate and an annular lower supporting plate are supported by the supporting bars in such a way that said upper and lower supporting plates face each other maintaining a predetermine distance in between via a spacer, each of the transmission gears is equipped with an upper guide plate and a lower guide plate and meshed with the sun gear and the ring gear so the sun and ring gears is prevented from moving vertically; and an upper roller is inserted between the upper supporting plate and the upper surface of each transmission gear, and a lower roller is inserted between the lower supporting plate and the lower surface of each transmission gear so as to prevent the transmission, sun and ring gears from moving radially.

6. A mowing machine according to claim 5, in which gaskets that come into contact with a surface of the sun gear or ring gear is provided at internal and external edges of the upper and lower supporting plates so as to form a sealed meshing space for the transmission, sun and ring gears, and said meshing space is filled with lubricant.

7. A mowing machine according to claim 1, in which external edges of the main unit case and the sun gear are inclined downward, an internal edge of the ring gear is inclined upward, and a transmission gear, which is mounted on a shaft that is inclined with respect to a rotating axis of the sun and ring gears, is meshed with the sun and ring gears.

* * * * *

UNITED STATES PATENT AND TRADEMARK OFFICE
CERTIFICATE OF CORRECTION

PATENT NO. : 6,105,351
DATED : August 22, 2000
INVENTOR(S) : Kazuo Itoh

It is certified that error appears in the above-identified patent and that said Letters Patent is hereby corrected as shown below:

<u>Title Page,</u>
Item [30] Foreign Application Priority Data:
Add -- July 14, 1997    [JP]    Japan ....... 9-203848
        Mar. 13, 1998    [JP]    Japan ....... 10-82500 --

Signed and Sealed this

Ninth Day of October, 2001

Attest:

*Nicholas P. Godici*

NICHOLAS P. GODICI
*Attesting Officer*    *Acting Director of the United States Patent and Trademark Office*